May 19, 1936.   J. BRASTY   2,041,321
MOLD FOR RETREADING TIRES
Filed July 25, 1934   2 Sheets-Sheet 1
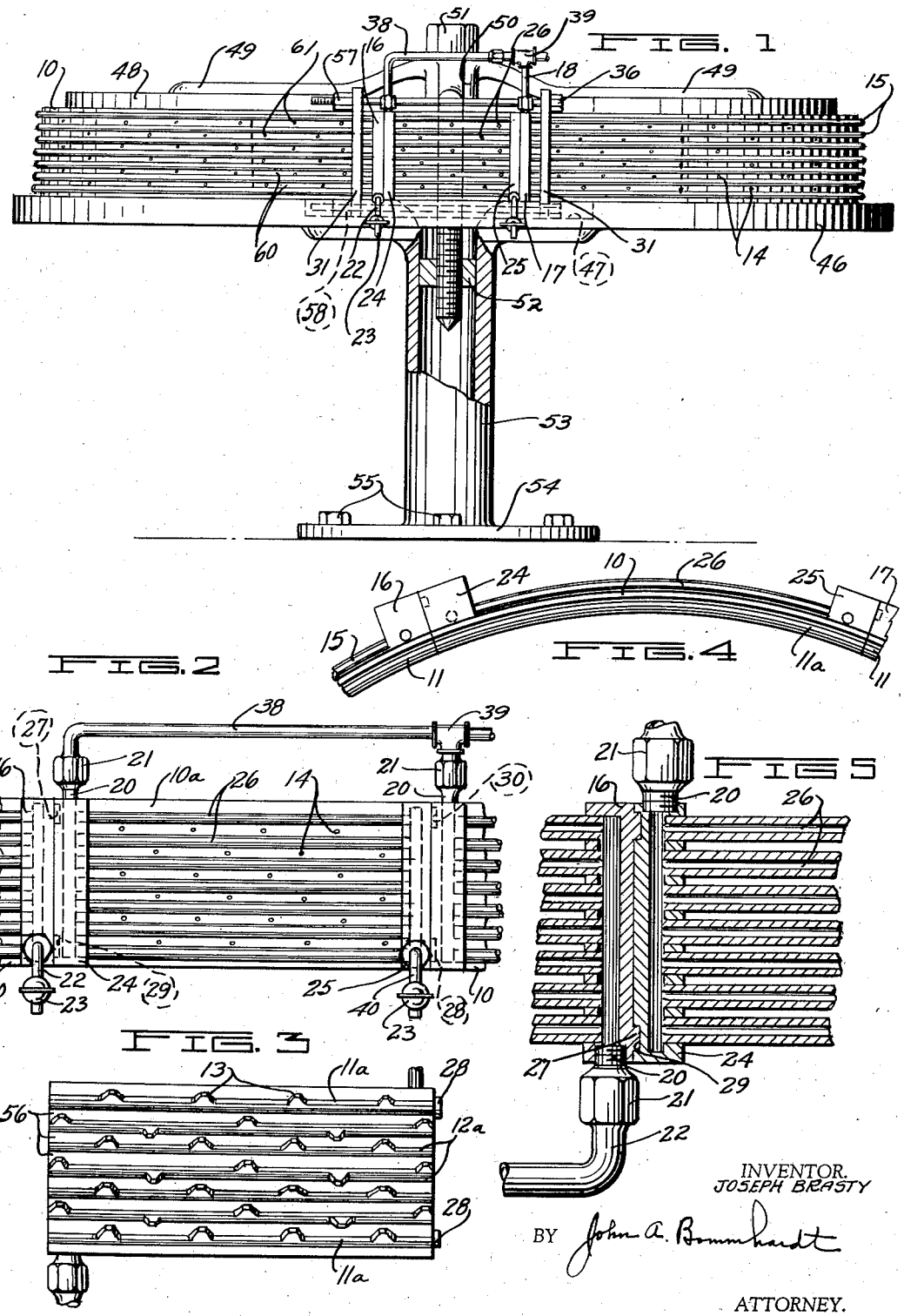
INVENTOR.
JOSEPH BRASTY
BY John A. Bommhardt
ATTORNEY.

May 19, 1936.  J. BRASTY  2,041,321
MOLD FOR RETREADING TIRES
Filed July 25, 1934   2 Sheets-Sheet 2
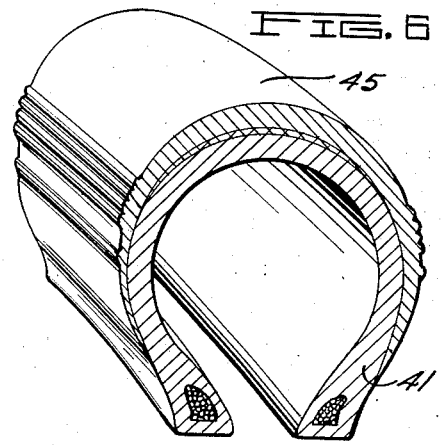
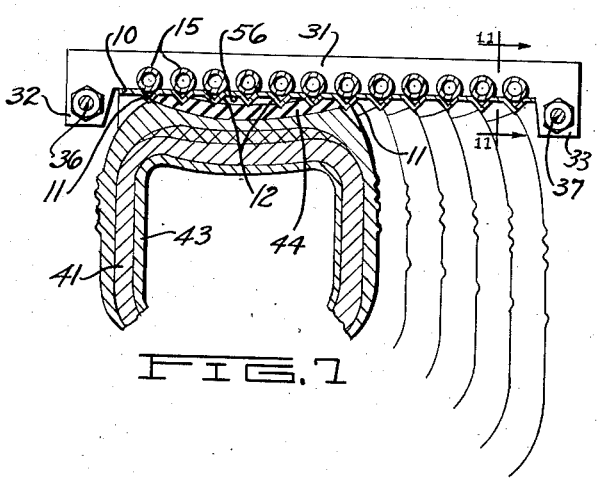
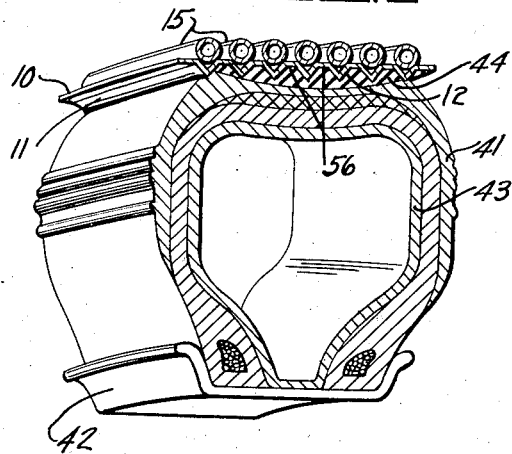
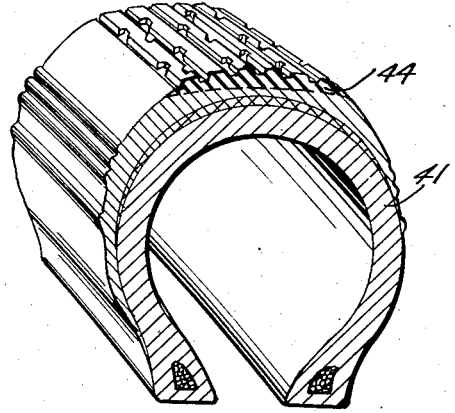
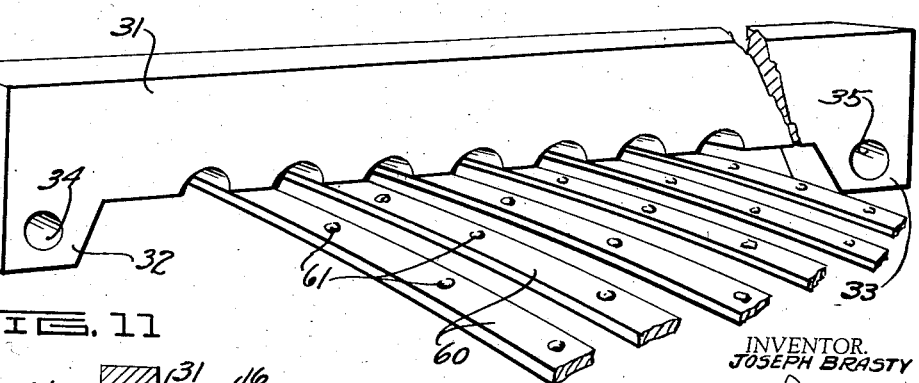
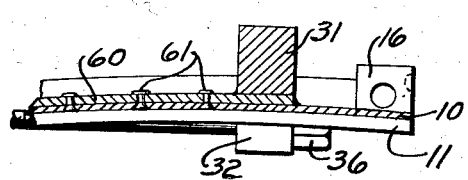
INVENTOR.
JOSEPH BRASTY
BY
ATTORNEY.

Patented May 19, 1936

2,041,321

UNITED STATES PATENT OFFICE 2,041,321

MOLD FOR RETREADING TIRES

Joseph Brasty, Maple Heights, Ohio, assignor of one-third to Albert R. Meyer, Cleveland, Ohio Application July 25, 1934, Serial No. 736,923

6 Claims. (Cl. 18—18)

My invention relates to improvements in mold structures for retreading tires, and to the method by which it is done.

One object being to provide a means whereby any size mold structure can be made to do retreading on one or more tires of slightly larger sizes and widths.

Another object is to provide means whereby the tire is heated around its entire circumference in such manner as to insure a retread which becomes an actual part of the tire and which will come off only by constant wear as does the original tread.

Another object is to provide an insert extension strip which will be to all intent and purpose, an actual part of the retreading mold structure when clamped in position.

Other objects and advantages may be noted from the following specification and its accompanying illustrations in which:

Fig. 1 is a side elevation of a complete mold structure with a tire casing and insert extension strip in clamped position on a curing table.

Fig. 2 is an enlarged outside elevation of the insert extension strip showing the heat tubes.

Fig. 3 is an enlarged inside elevation of the insert extension strip showing the mold pattern.

Fig. 4 is an enlarged top plan of the insert extension strip.

Fig. 5 is an enlarged fragmentary section of the mold structure and of the insert extension strip showing the method of interlocking and the method by which the heat is sent though the extension strip.

Fig. 6 is a perspective view in section, of a tire casing before retreading.

Fig. 7 is a sectional and diagrammatic view of the outer part of the tire casing with the raw rubber applied and the mold structure in position but before application of the vulcanizing heat, and showing method of application to larger width tires.

Fig. 8 is a perspective view in section illustrating the retreaded casing as it appears in the mold structure after vulcanizing.

Fig. 9 is a perspective view similar to Fig. 6 showing the casing with the retread after removal from the mold structure.

Fig. 10 is a perspective view of the locking bar and metal strips by which it is mounted to the body.

Fig. 11 is a section taken on line 11—11 of Fig. 7.

Referring to the drawings: the mold structure comprises an annular flexible split metal band or relatively thin sheet metal section 10 which is substantially straight in axial cross section and is provided with annular retaining ribs 11 at its outer edges and intermediate retaining ribs 12 with annular tread design-forming ribs 13, intersecting ribs 12.

This mold structure may be used with tire casings, having a greater normal circumference than that of the inside of the mold structure and used as hereinafter described.

Between the ribs 11, 12 and 13 and through the annular section 10 are a plurality of air discharge ports 14.

The mold structure may be heated in many ways but the preferred method is by means of a series of tubes 15 superimposed around the entire circumference of the annular section 10 the ends of said tubes being mounted within hollow cross headers or members 16 and 17 respectively. A steam supply pipe 18 may be attached to hollow header 17 by means of a nipple 20 and union 21, the steam passing through the hollow header 17 and the tubes 15 to the hollow header 16 from which it is discharged through exhaust pipe 22 attached to header 16 and out through a faucet 23.

This structure forms the main part of the mold and may be used with or without the extension sections to be hereinafter described. When used without them, the headers 16 and 17 are drawn together to form a complete circle of the normal size.

For larger sizes of tires I employ insert extension sections to be described, which may be of various lengths according to the size of the particular tire being retreaded. When such a section is used the main part of the mold is spread or enlarged and the section is inserted between the headers 16 and 17.

Each extension section comprises a plate or segment 10a with ribs 11a and 12a, corresponding to the ribs 11 and 12 of the main part, and provided at its ends with hollow headers 24 and 25 similar to headers 16 and 17, and tubes 26. Said tubes are inserted in said hollow headers in the same manner as tubes 15 are inserted in headers 16 and 17 and are mounted between said headers 16 and 17 in such manner as to interlock header 16 with header 24 and header 17 with header 25. A pair of lugs 27 and 28 on headers 16 and 25 respectively, fit within sockets 29 and 30 in headers 24 and 17. A pair of locking bars 31 are rigidly mounted by means of metal strips 60 and rivets 61 to which they are welded, as shown in Fig. 11, over tubes 15 adjacent the hollow headers 16 and 17, said bars having projecting arms 32 and 33 with apertures 34 and 35 therethrough to receive bolts 36 and 37, said bolts being drawn tight by nuts 57 and 58 to lock the insert extension in position.

When an extension strip or section is used it is necessary to have an intake and exhaust pipe for said extension strip in addition to intake 18 and exhaust 22 and a direct flow of heat is also necessary, therefore a connection of different lengths is obtained by means of an intake pipe 38 attached at each end to a nipple 20 by means of a union 21, one nipple being attached to a T 39 and the other to the cross member 24, while cross member 25 has an exhaust outlet 40 similar to exhaust outlet 22 in the header 16. Thus the flow of heat enters tubes 26 in extension strip through intake pipe 38 at the same time it enters the tubes 15 in the mold structure and flows out through exhaust pipes 40 and 22 simultaneously, said exhaust pipe may be attached through the side of the headers 16 and 25 as shown in Figs. 1 and 2 or through the bottom of said headers as shown in Fig. 5.

In operation, a casing 41 as shown in Fig. 6, is mounted on a rim 42 after an inner tube 43 is placed within said casing, and a strip of raw or unvulcanized rubber 44 is applied to the crown 45 of the casing by any suitable means and is of such width as will reach between the annular retaining ribs 11. The casing 41 is then mounted within the mold structure after distending the sides of said casing by suitable means thereby contracting the crown portion to a lesser circumference than that of the inside of the mold structure, as indicated in Fig. 7. Then, the spreading means being removed, the unvulcanized rubber 44 contacts the tread forming ribs 12 and 13.

The casing 41 within the mold structure is then placed on a curing table 46. This table has a recess 47 in its top surface of sufficient length and width to receive the projecting arms 33 of the locking bars 31 and bolt 37 thus causing the casing 41 to rest flatly upon the surface of the curing table 46.

A pressure plate 48 is then superimposed over the top of casing 41, said plate having a plurality of arms 49 extending from a hub or center 50 outwardly over the top of said plate and forming an integral part thereof, and a pressure bolt 51 is inserted through the hub 50 and turned down within a threaded disk 52 rigidly mounted within a hollow pedestal base 53, said base being flanged at 54 and bolted to the floor by bolts 55.

After pressure bolt 51 is turned down sufficiently to insure the necessary amount of pressure on the casing 41, air or fluid is forced into the inner tube 43 to expand the crown and shoulder of the casing 41 until the newly applied tread is pressed tightly against the tread forming ribs 12 and 13 and the original shoulder tread ribs at each side of the new tread tightly against the annular retaining ribs 11.

Illustrative of this procedure, Fig. 7 is shown with the ribs 12 partially imbedded in the raw or unvulcanized rubber.

Steam is now turned into the mold structure through the header 17 by means of the intake 18, and the steam circles the structure through tubes 15 and out through exhaust pipe 22, by way of header 17, if the insert extension strip is used, steam also enters through intake 38 and goes out through exhaust 40, by way of the headers 24 and 25 and tubes 26.

Under this heat and the expanding pressure of the casing the forming ribs 12 and 13 completely enter the newly applied raw rubber and the annular retaining ribs 11 will enter the original shoulder tread as illustrated by Fig. 8.

The heat causes the rubber to flow through the grooves 56 between the forming ribs 12 and 13 and due to the pressure against lateral expansion being greater at the shoulders, the rubber 44 flows away from the shoulders and towards the center or crown of the casing 41 thus equalizing the expanding pressure on the new tread which will be vulcanized in a flat condition as shown in Fig. 8.

When the casing 41 is released from the curing table 46 it is removed from the mold structure in substantially the same manner in which it was inserted, and the casing 41 upon removal from the mold structure resumes its normal shape and the newly applied tread becomes rounded as it was with the original tread as illustrated by Fig. 9.

It is obvious from the foregoing that the insertion of an extension section will eliminate the need for a majority of the structures now necessary for retreading tires as several sections of different lengths may be used with one mold structure to retread several different sized and width tires.

I claim:

1. A tire mold comprising a flexible split band capable of being flexed throughout its length to vary its size, and a separable extension inserted between the ends of the band, the band and section being each provided with heating tubes, and headers at the ends thereof.

2. A tire mold as in claim 1, and means to connect the headers of the extension with the headers of the band.

3. A tire mold as in claim 1, and supply connections between a header of the band and a header of the extension, whereby a continuous flow through all the tubes is provided, and outlets from headers of the band and extension.

4. A tire mold comprising a transversely separable band provided with exterior heating tubes and headers at each end thereof, and a removable extension section between the ends of the band, said extension being provided with exterior tubes, and headers at the ends thereof, and means to connect the headers of the extension section with the headers of the band.

5. A tire mold as in claim 4, said means including interengaging lugs and sockets on the headers.

6. A tire mold as in claim 1, and means to clamp the ends of the band and section together.

JOSEPH BRASTY.